(12) United States Patent
Yamasuge

(10) Patent No.: US 8,207,847 B2
(45) Date of Patent: Jun. 26, 2012

(54) WIRELESS COMMUNICATION APPARATUS, WIRELESS COMMUNICATION SYSTEM, WIRELESS COMMUNICATION METHOD, AND PROGRAM

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 12/419,636

(22) Filed: Apr. 7, 2009

(65) Prior Publication Data

US 2009/0251309 A1   Oct. 8, 2009

(30) Foreign Application Priority Data

Apr. 8, 2008  (JP) ................ P2008-100744

(51) Int. Cl.
*G08B 1/08*  (2006.01)
(52) U.S. Cl. .................................................. 340/539.3
(58) Field of Classification Search ............... 340/539.3, 340/636.1, 639.19; 455/522, 423; 320/107
See application file for complete search history.

(56) References Cited

U.S. PATENT DOCUMENTS

| 2007/0010295 | A1* | 1/2007 | Greene et al. ............... 455/572 |
| 2007/0021140 | A1* | 1/2007 | Keyes et al. ................ 455/522 |
| 2008/0227478 | A1* | 9/2008 | Greene et al. ............... 455/522 |
| 2008/0303479 | A1  | 12/2008 | Park et al. |
| 2009/0284218 | A1* | 11/2009 | Mohammadian et al. ..... 320/107 |
| 2009/0284369 | A1* | 11/2009 | Toncich et al. ............. 340/539.3 |

FOREIGN PATENT DOCUMENTS

| JP | 2000-90220 | 3/2000 |
| JP | 2001-186676 | 7/2001 |
| JP | 2003-47177 | 2/2003 |
| JP | 2005-210843 | 4/2005 |
| JP | 2006-229583 | 8/2006 |
| JP | 2006-238548 | 9/2006 |
| JP | 2006-287555 | 10/2006 |
| JP | 2009-504116 | 1/2009 |

* cited by examiner

*Primary Examiner* — Phung Nguyen
(74) *Attorney, Agent, or Firm* — Finnegan, Henderson, Farabow, Garrett & Dunner, L.L.P.

(57) ABSTRACT

A wireless communication apparatus according to the present invention includes a wireless communication transmitting circuit and a wireless communication receiving circuit that perform communication with another apparatus connected through a wireless communication network; a power situation acquiring unit that acquires a power situation of the wireless communication apparatus; and a wireless power transmitting circuit that wirelessly supplies power to another apparatus in accordance with a power supply request from another apparatus connected through the wireless communication network, when the power situation of the wireless communication apparatus satisfies a predetermined condition.

9 Claims, 18 Drawing Sheets

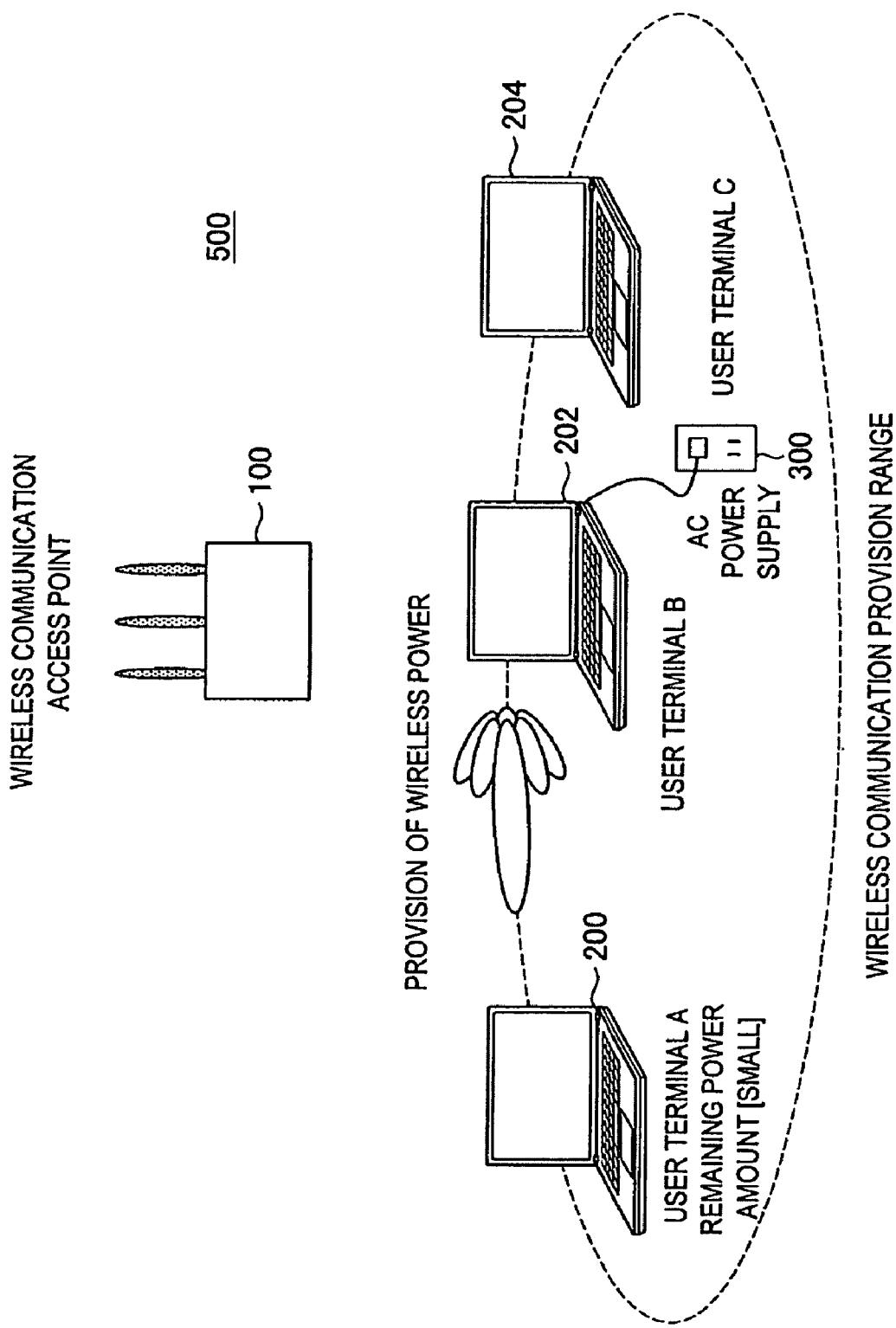

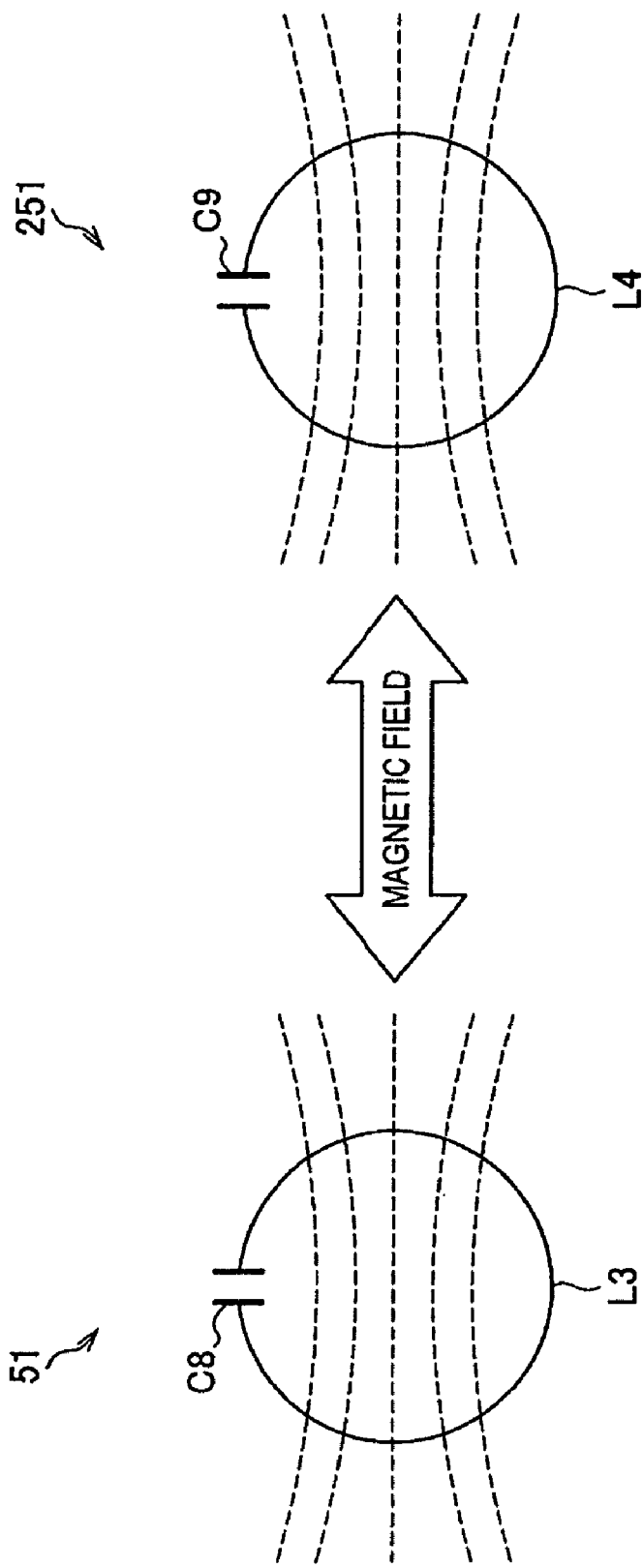

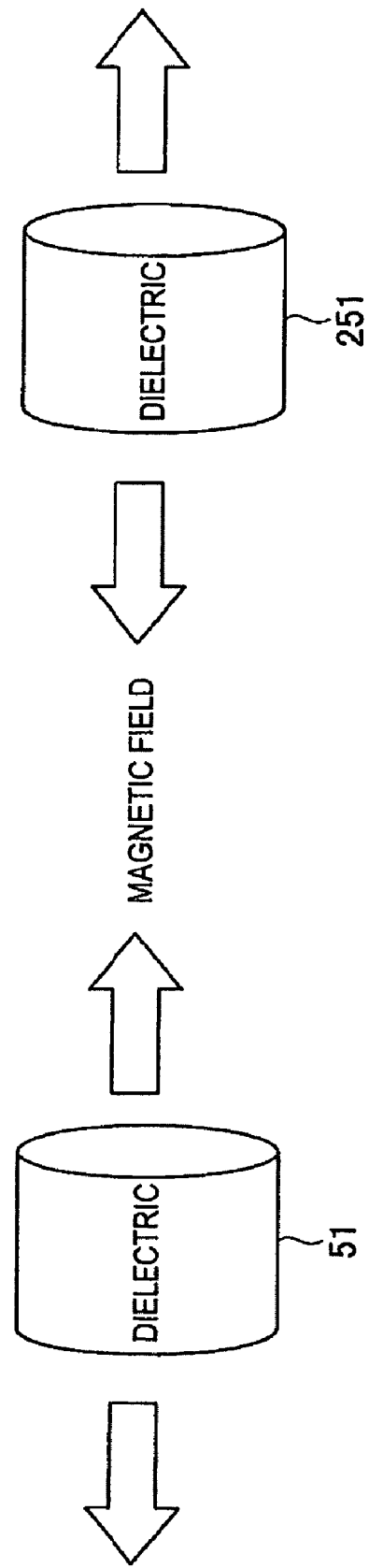

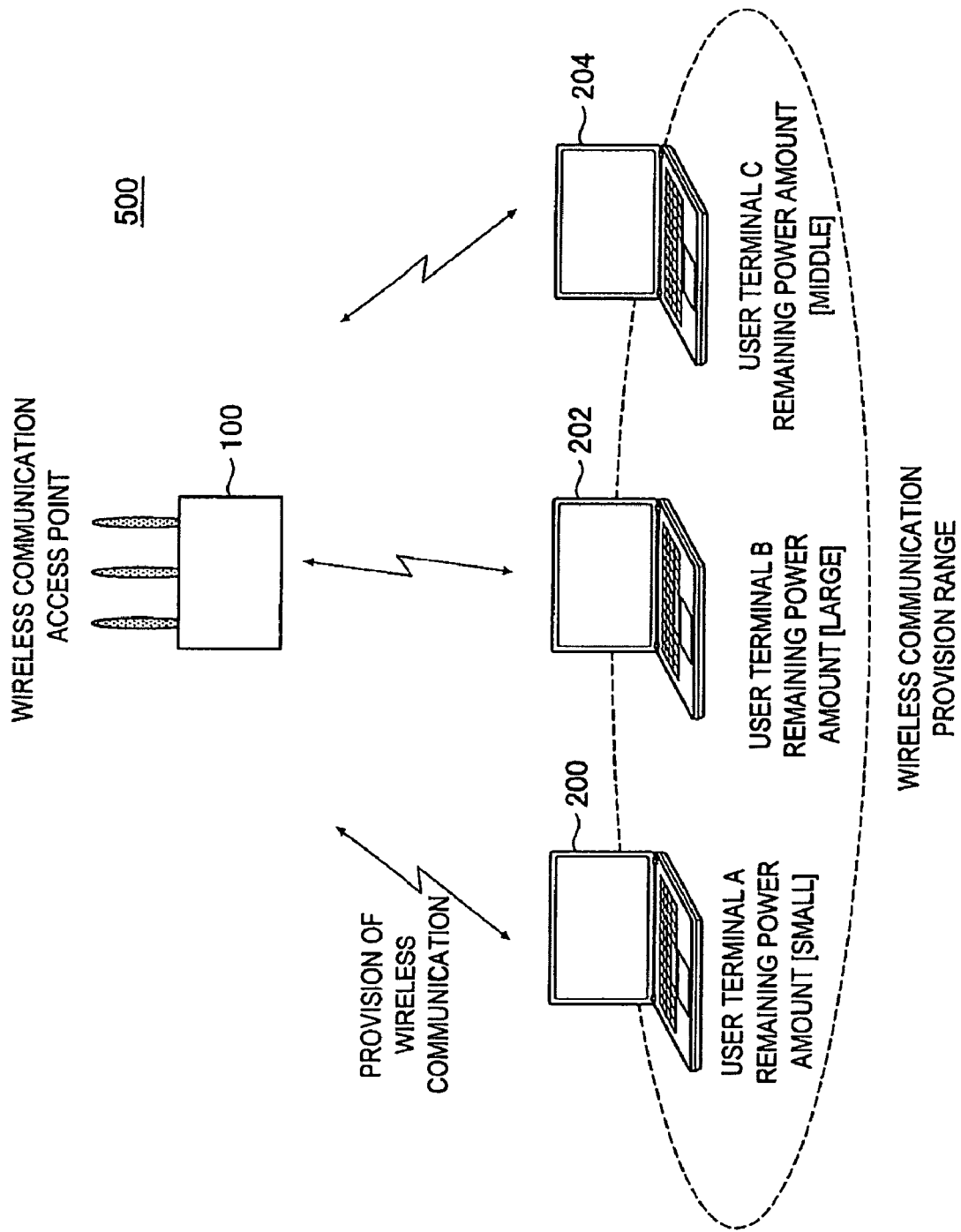

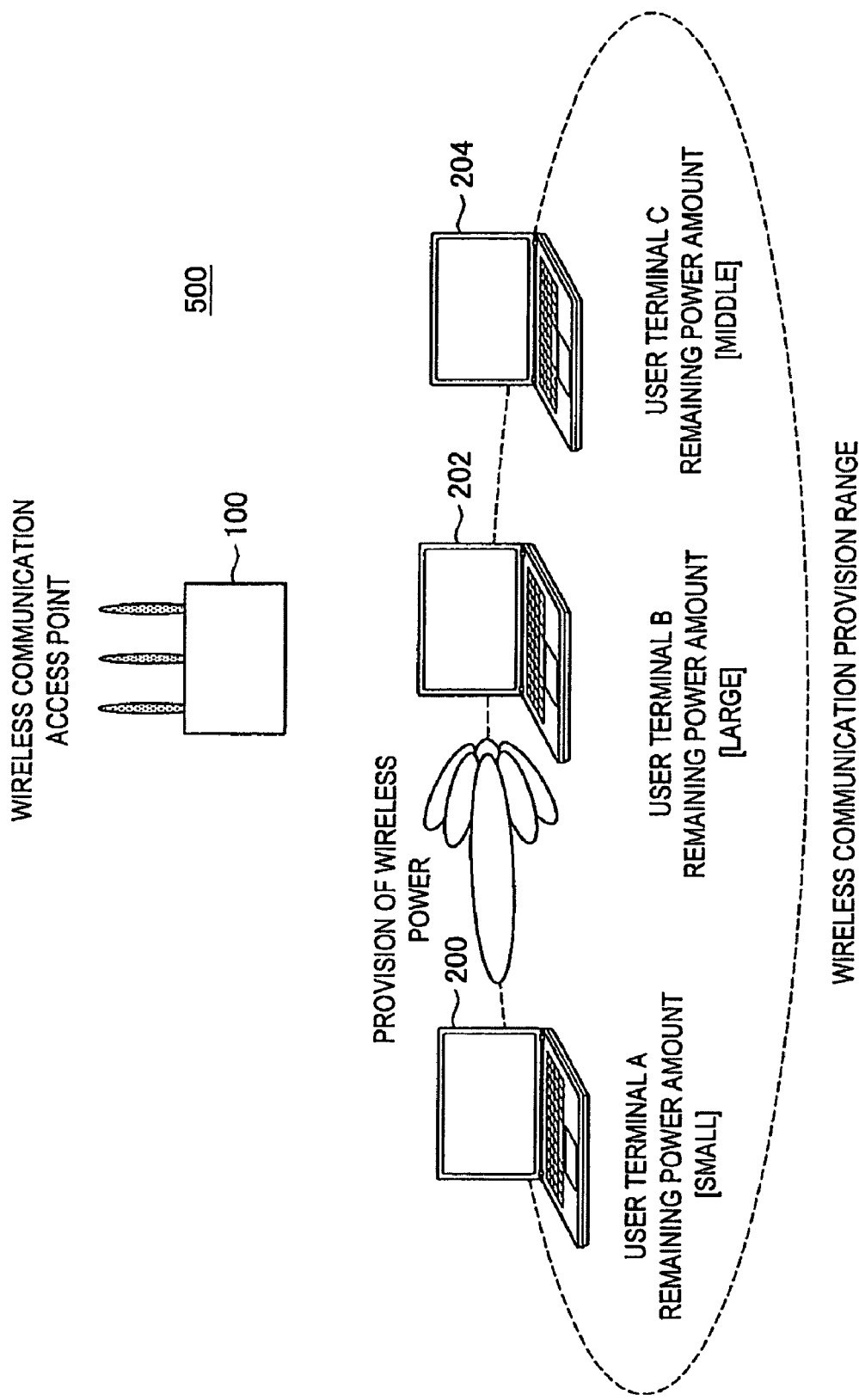

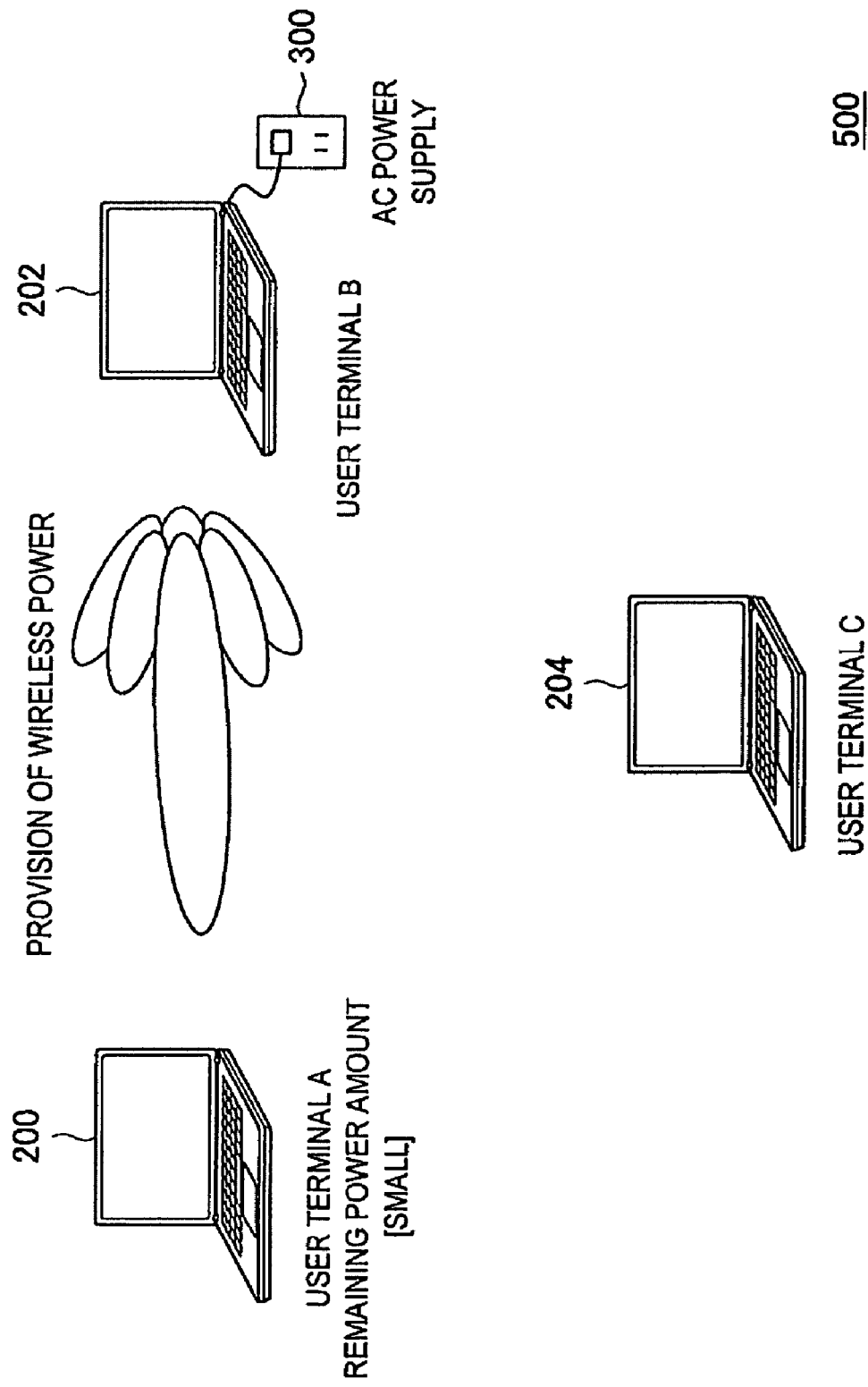

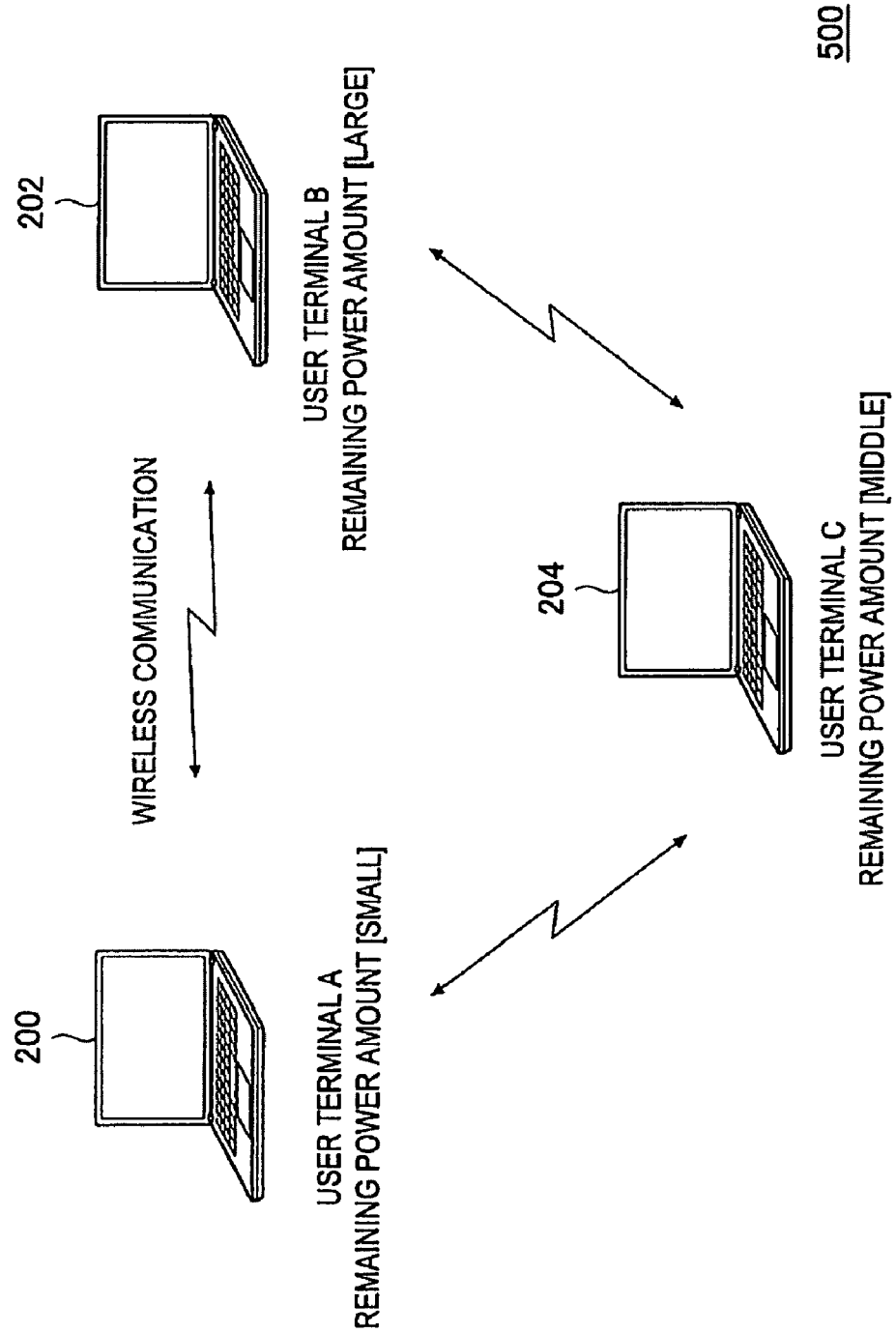

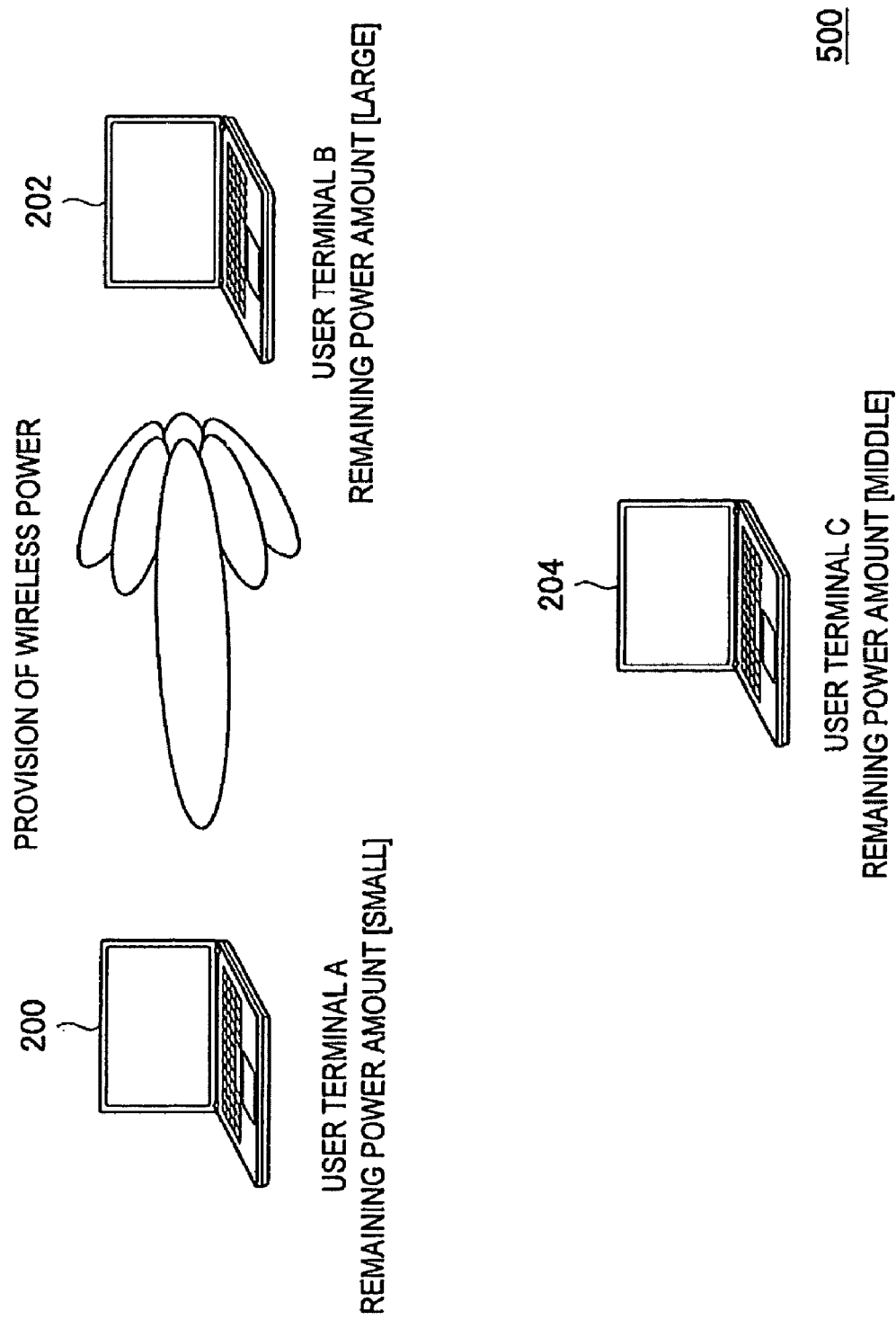

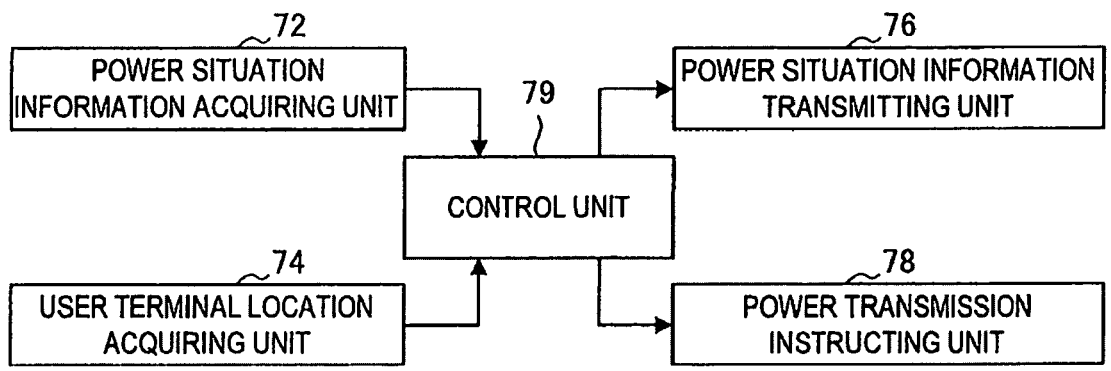
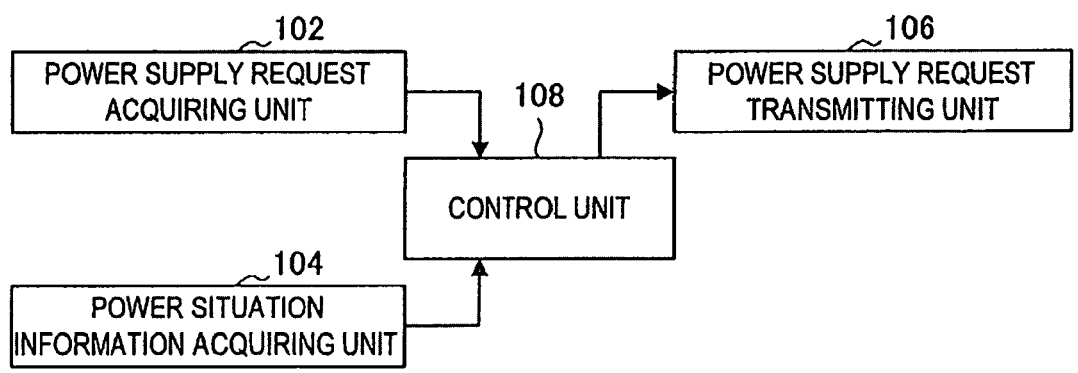

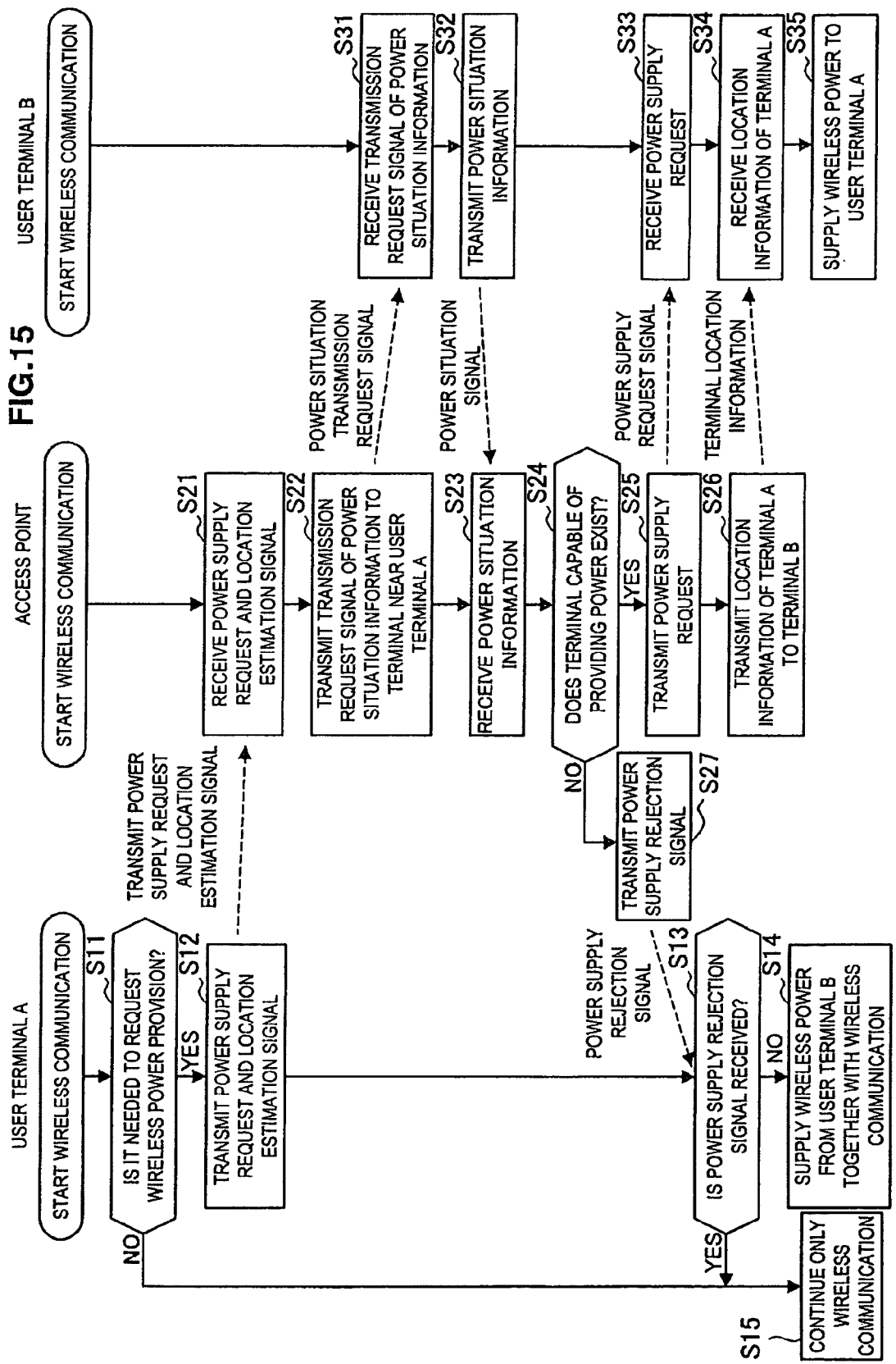

WIRELESS COMMUNICATION APPARATUS, WIRELESS COMMUNICATION SYSTEM, WIRELESS COMMUNICATION METHOD, AND PROGRAM

BACKGROUND OF THE INVENTION

1. Field of the Invention

The present invention relates to a wireless communication apparatus, a wireless communication system, a wireless communication method, and a program.

2. Description of the Related Art

In recent years, wireless power transmitting apparatuses that can wirelessly transmit power have been suggested, and an example of the wireless power transmitting apparatuses is disclosed in Japanese Patent Application Laid-Open (JP-A) No. 2006-238548. Specifically, the wireless power transmitting apparatus that is disclosed in JP-A No. 2006-238548 is mainly used to improve efficiency of power transmission, and displays a screen according to a power reception result using a power receiving apparatus.

Japanese Patent Application Laid-Open No. 2006-238548

SUMMARY OF THE INVENTION

However, in the wireless power transmission, in a plurality of terminals on a network, a remaining power amount of each terminal may be different. For example, since a terminal that is adjacent to a power supply apparatus to supply wireless power is supplied with sufficient power, the terminal can be used for a long time. Meanwhile, since a terminal that is distant from the power supply apparatus is supplied with insufficient power, the terminal may not be used for a long time.

Accordingly, the present invention addresses the above-identified, and other issues associated with conventional methods and apparatuses. There is a need for a wireless communication apparatus, a wireless communication system, a wireless communication method, and a program that can surely supply power to a plurality of terminals on a wireless communication network.

According to an embodiment of the present invention, there is provided a wireless communication apparatus. The wireless communication apparatus includes a wireless communication unit that performs communication with another apparatus connected through a wireless communication network; a power situation acquiring unit that acquires a power situation of the wireless communication apparatus; and a power supply unit that wirelessly supplies power to another apparatus in accordance with a power supply request from another apparatus connected through the wireless communication network, when the power situation of the wireless communication apparatus satisfies a predetermined condition.

The wireless communication apparatus may further include a remaining power amount acquiring unit that acquires the remaining power amount of the wireless communication apparatus. When the remaining power amount is not more than a predetermined value, the power supply request may be transmitted to another apparatus that is connected through the wireless communication network.

The predetermined condition may be a condition indicating that the wireless communication apparatus is connected to a power supply or a condition indicating that the remaining power amount of the wireless communication apparatus is not less than the predetermined value.

The wireless communication unit may receive the power supply request transmitted from another apparatus through an access point of the wireless communication network.

The wireless communication unit may transmit the power situation of the wireless communication apparatus to the access point, and the access point may determine whether the power situation of the wireless communication apparatus satisfies the predetermined condition.

The wireless communication unit may receive the power supply request from another apparatus connected through the wireless communication network, and transmit the power situation of the wireless communication apparatus to another apparatus, and another apparatus that transmits the power supply request may determine whether the power situation of the wireless communication apparatus satisfies the predetermined condition.

The wireless communication apparatus may further include a location acquiring unit that acquires a location of another apparatus supplying the power by the power supply unit. The power supply unit may supply the power based on the location of another apparatus.

According to another embodiment of the present invention, there is provided a wireless communication system. The wireless communication system includes a wireless communication apparatus, which includes a power supply request acquiring unit that acquires a power supply request from an arbitrary terminal apparatus connected through a wireless communication network, a power situation acquiring unit that acquires a power situation of another terminal apparatus, and a power supply request transmitting unit that transmits the power supply request to a terminal apparatus where power supply is enabled based on the power situation; and the terminal apparatuses, which include a power situation transmitting unit that transmits the power situation to the wireless communication apparatus, a power supply request receiving unit that receives the power supply request, and a power supply unit that wirelessly supplies power to the arbitrary terminal apparatus that transmits the power supply request to the wireless communication apparatus, in accordance with the power supply request.

According to another embodiment of the present invention, there is provided a wireless communication method. The wireless communication method includes the steps of: performing communication with another apparatus connected through a wireless communication network; acquiring a power situation of a self apparatus; and wirelessly supplying power to another apparatus in accordance with a power supply request from another apparatus connected through the wireless communication network, when the power situation of the self apparatus satisfies a predetermined condition.

According to another embodiment of the present invention, there is provided a program. The program allows a computer to function as: a unit performing communication with another apparatus connected through a wireless communication network; a unit acquiring a power situation of a self apparatus; and a unit wirelessly supplying power to another apparatus in accordance with a power supply request from another apparatus connected through the wireless communication network, when the power situation of the self apparatus satisfies a predetermined condition.

According to the embodiments of the present invention described above, it is possible to provide a wireless communication apparatus, a wireless communication system, a wireless communication method, and a program that can surely supply power to a plurality of terminals on a wireless communication network.

BRIEF DESCRIPTION OF THE DRAWINGS

FIG. 5 is a schematic diagram illustrating an aspect where a user terminal B, which receives a request of supply of wireless power from an access point, supplies the wireless power to a user terminal A;

FIG. 6C is a diagram illustrating the configuration of a power exchanging unit that operates in a magnetic field resonance type;

FIG. 6D is a diagram illustrating the configuration of a power exchanging unit that operates in an electric field resonance type;

FIG. 7 is a schematic diagram illustrating an example of when a user terminal to perform power supply is determined based on the remaining power amount of each user terminal;

FIG. 8 is a schematic diagram illustrating an example of when a user terminal to perform power supply is determined based on the remaining power amount of each user terminal;

FIG. 10 is a schematic diagram illustrating an example of when a user terminal to perform power supply is determined, in a wireless communication system where an access point does not exist and a piconet is formed between user terminals;

FIG. 11 is a schematic diagram illustrating an example of when a user terminal to perform power supply is determined based on the remaining power amount of each user terminal, in the case where a piconet is formed between user terminals;

FIG. 12 is a schematic diagram illustrating an example of when a user terminal to perform power supply is determined based on the remaining power amount of each user terminal, in the case where a piconet is formed between user terminals;

FIG. 13 is a block diagram illustrating the functional configuration of a MAC of each user terminal;

FIG. 14 is a block diagram illustrating the functional configuration of a MAC of an access point;

FIG. 15 is a flowchart illustrating a process when an access point transmits a power supply request to a user terminal;

DETAILED DESCRIPTION OF THE PREFERRED EMBODIMENTS

Figure 1:
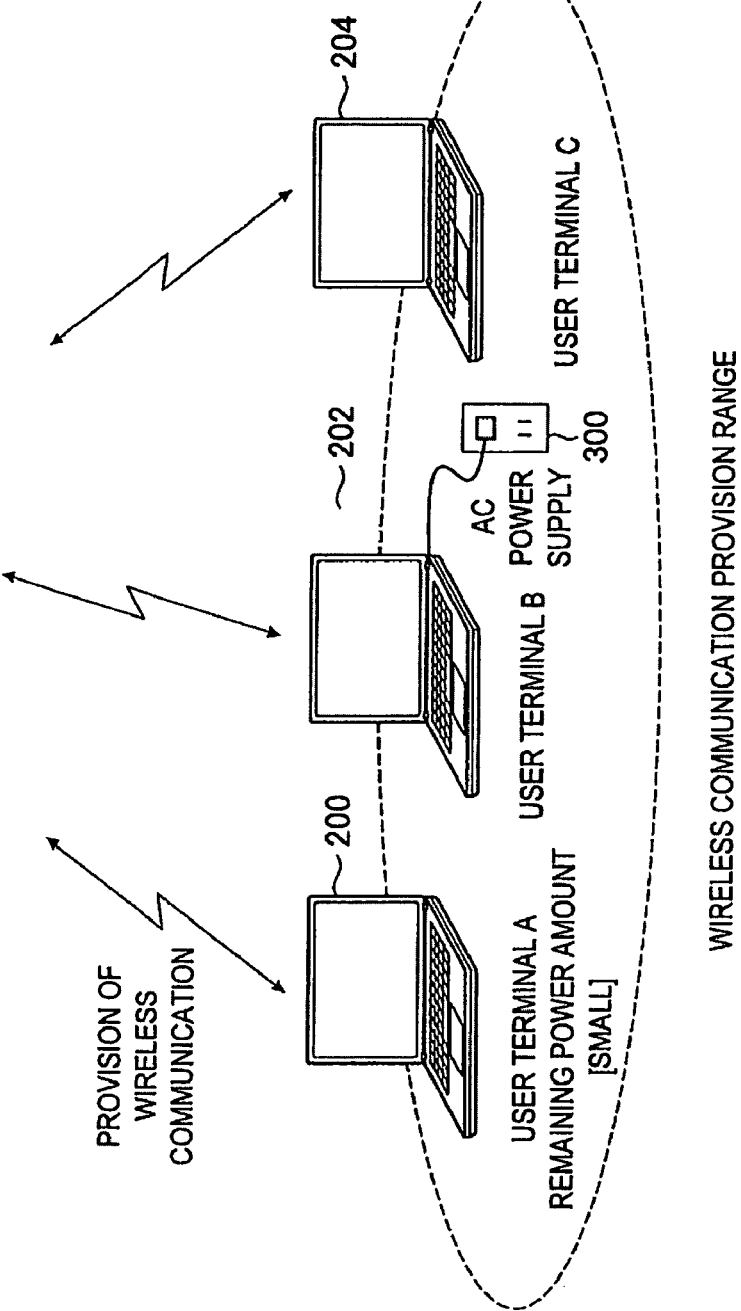
FIG. 1 is a schematic diagram illustrating the configuration of a wireless communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is a schematic diagram illustrating the configuration of a wireless communication system 500 according to an embodiment of the present invention. As illustrated in FIG. 1, the wireless communication system according to this embodiment includes an access point 100 that functions as a wireless communication apparatus and a plurality of portable terminals (a user terminal A 200, a user terminal B 202 and a user terminal C 204). The access point 100 and the individual user terminals 200, 202 and 204 are connected to each other through a wireless communication network, such that they can communicate with each other. Each of the access point 100 and the user terminals 200, 202 and 204 is a wireless communication apparatus that corresponds to an MB-OFDM scheme of a UWB.

Figure 2:
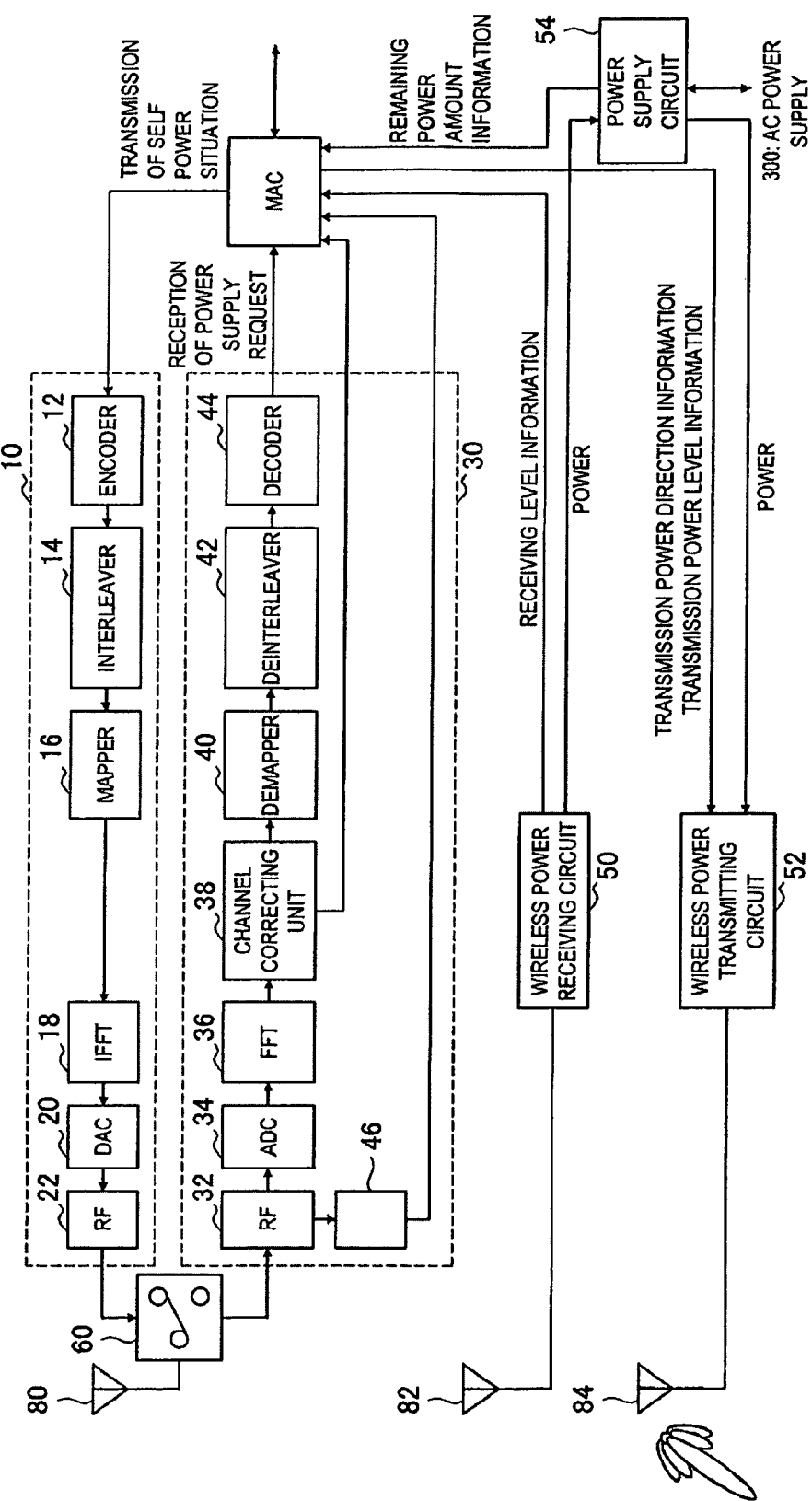
FIG. 2 is a schematic diagram illustrating the configuration of each user terminal.

In the wireless communication system 500 according to this embodiment, each of the user terminals is configured to transmit power to another user terminal using a method, which will be described below. FIG. 2 is a schematic diagram illustrating the configuration of each of the user terminals 200, 202 and 204. Each of the user terminals 200, 202 and 204 performs wireless communication with the access point 100, and transmits power situation information to the access point 100. The access point 100 receives power situation information that is transmitted from each of the user terminals. In this case, the power situation information includes remaining power amount information (remaining battery capacity information) of each user terminal and information (AC power supply connection information) that indicates whether each user terminal is connected to an AC power supply 300. In addition, when there is a user terminal where the remaining power amount is small and power is supplied, the access point 100 detects a location of the user terminal and instructs another user terminal to wirelessly supply power. For this reason, as illustrated in FIG. 2, each of the user terminals 200, 202 and 204 includes a wireless communication transmitting circuit 10, a wireless communication receiving circuit 30, a wireless power receiving circuit 50, and a wireless power transmitting circuit 52.

The wireless communication transmitting circuit 10 has an encoder 12, an interleaver 14, a mapper 16, an IFFT 18, a DA converting circuit (DAC) 20, and an RF circuit 22. In addition, the wireless communication receiving circuit 30 has an RF circuit 32, an AD converting circuit (ADC) 34, an FFT 36, a channel compensating unit 38, a demapper 40, a deinterleaver 42, and a decoder 44.

Further, each of the user terminals 200, 202 and 204 includes a transmission/reception switching unit 60, a MAC (data link layer) 70, and antennas 80, 82 and 84. The transmission/reception switching unit 60 is connected between the RF circuits 22 and 32 and the antenna 80 and switches transmission and reception. The MAC 70 functions as a control unit of the individual user terminals, and generates data transmitted from the wireless communication transmitting circuit 10 and acquires data received by the wireless communication receiving circuit 30. As will be described below, the MAC 70 controls wireless power transmission by the wireless power transmitting circuit 52 in accordance with power situation information that is acquired from another user terminal.

In the wireless communication transmitting circuit 10, the data that is transmitted from the MAC 70 is encoded by the encoder 12 and interleaved by the interleaver 14. The interleaved transmitted data is subjected to frequency mapping by the mapper 16 and subjected to inverse fast Fourier transform by the IFFT 18. An output signal from the IFFT 18 is converted into an analog signal by the DA converting circuit 20, up-converted by the RF circuit 22, and transmitted from the antenna 80.

In the wireless communication receiving circuit 10, a signal that is received by the antenna 80 is modulated by the RF circuit 32, and converted into an analog signal by the AD converting circuit 34. The analog signal is subjected to fast Fourier transform by the FFT 36 and transmitted to the channel compensating unit 38. The channel compensating unit 38 executes a process of compensating for a channel of the received signal. The signal that is compensated by the channel compensating unit 38 is transmitted to the demapper 40 and subjected to frequency demapping. The demapped signal is transmitted to the deinterleaver 42. The deinterleaver 42 executes a process of returning the interleaved received signal to the original signal. The received signal that is output from the deinterleaver 42 is transmitted to the decoder 44 and subjected to decoding. An output signal from the decoder 44 is transmitted to the MAC 70.

Each of the user terminals 200, 202 and 204 detects a location of another user terminal using an arrival direction estimation algorithm such as an MUSIC, a distance measurement system using a correlator, or a method such as a three-point location measurement method using a plurality of access points.

Figure 3:
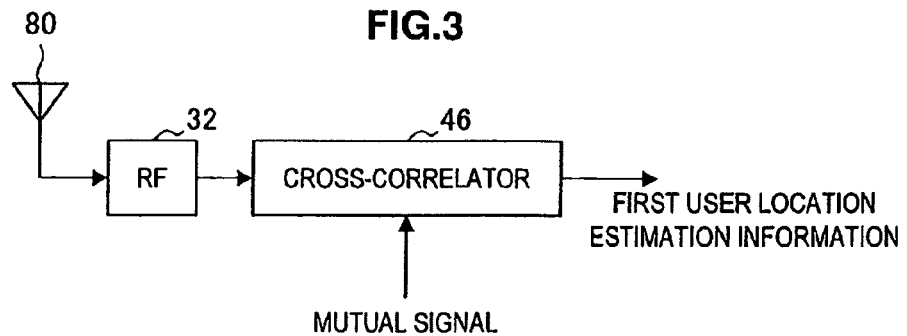
FIG. 3 is a schematic diagram illustrating an example of a location detecting circuit that detects a location of a user terminal.

FIG. 3 is a schematic diagram illustrating an example of a location detecting circuit that detects a location of a user terminal, which illustrates an example of a circuit that detects a location by a distance measurement system using a correlator. As illustrated in FIG. 3, the location detecting circuit is configured to have a cross-correlator 46. In the location detection by the cross-correlator 46, a distance and a direction to the user terminal are measured by detecting a correlation peak by taking a cross-correlation between a correlation signal previously held at the reception side of the access point 100 and a signal transmitted from the transmission side. For example, the cross-correlator 46 includes a plurality of shift registers where received signals are input in series, and can detect a distance between a transmitter and a receiver and a direction thereof by taking a cross-correlation between an output signal from each shift register and the previously held correlation signal. The location detecting circuit can be configured by using any one of analog circuits and digital circuits. When the cross-correlator 46 is composed of an analog circuit, as illustrated in FIG. 2, the cross-correlator 46 is disposed at a rear stage of the RF circuit 32, and location information of the user terminal that is detected by the cross-correlator 46 is transmitted to the MAC 70 as first user location estimation information.

Figure 4:
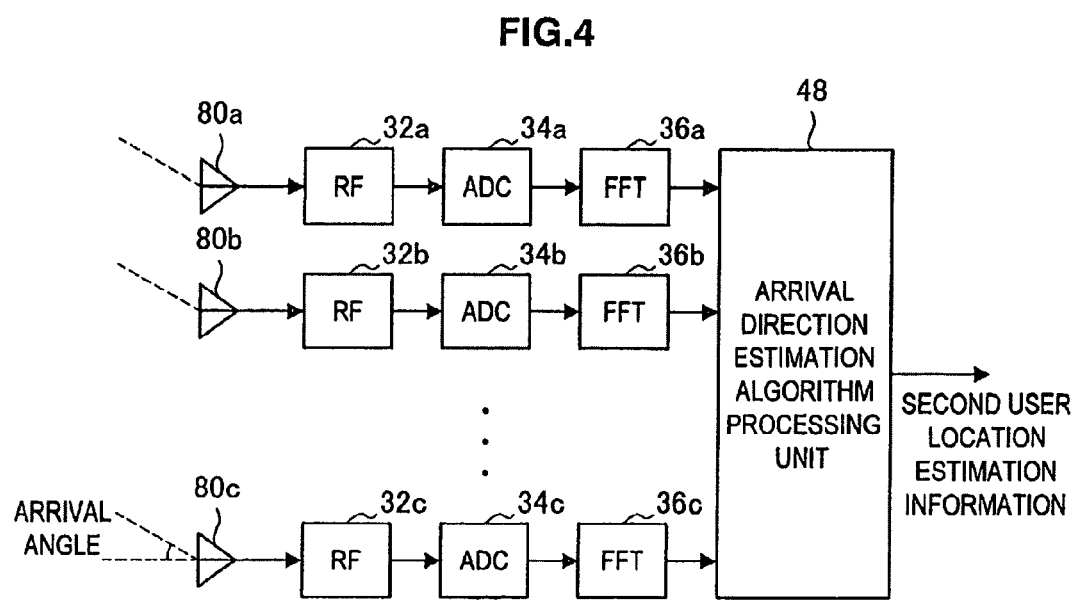
FIG. 4 is a schematic diagram illustrating another example of a location detecting circuit that detects a location of a user terminal.

FIG. 4 is a schematic diagram illustrating another example of a location detecting circuit that detects a location of a user terminal, which illustrates an example of a circuit that detects a location using an arrival direction estimation algorithm. When the location detecting circuit illustrated in FIG. 4 is used, a plurality of antennas 80*a* to 80*c* is provided as the antenna 80. In addition, as the RF circuit 32, the AD converting circuit 34, and the FFT 36, a plurality of RF circuits 32*a* to 32*c*, a plurality of AD converting circuits 34*a* to 34*c*, and a plurality of FFTs 36*a* to 36*c* are provided, respectively. In this case, output signals from the FFTs 36*a* to 36*c* are input to the arrival direction estimation algorithm processing unit 48. The location detecting circuit illustrated in FIG. 4 uses a phase difference or an amplitude difference of signals received by the plurality of antennas 80*a* to 80*c* to execute a process by the arrival direction estimation algorithm processing unit 48, thereby estimating an arrival direction. As the arrival direction estimation algorithm, an MUSIC (Multiple Signal Classification) that is generally used in an adaptive array antenna may be used. Since the arrival direction estimation algorithm processing unit 48 is composed of a digital circuit, the arrival direction estimation algorithm processing unit can be incorporated in the channel compensating unit 38 illustrated in FIG. 1. The location information of the user terminal that is detected by the arrival direction estimation algorithm processing unit 48 is transmitted as second user location estimation information to the MAC 70.

The wireless power receiving circuit 50 receives power that is supplied from another user terminal through the antenna 82. The wireless power receiving circuit 50 is connected to a power supply circuit 54, and power supplied from another user terminal is accumulated in the power supply circuit 54. The power supply circuit 54 is a circuit that uses a direct current power supply such as a battery or an alternating current power supply such as a commercially used power supply to generate output power from input power. The power that is supplied to the wireless power receiving circuit 50 is accumulated in the power supply circuit 54, or is not accumulated in the power supply circuit 54 but used for a circuit operation.

The wireless power transmitting circuit 52 is a circuit that supplies power to another user terminal. For this reason, the wireless power transmitting circuit 52 is connected to the power supply circuit 54, and receives power that is transmitted from the power supply circuit 54 to another user terminal. In addition, the wireless power transmitting circuit 52 is connected to the antenna 84 to transmit power to each user terminal.

The wireless power receiving circuit 50 transmits received level information to the MAC 70. Further, the power supply circuit 54 transmits remaining power amount information and AC power supply connection information to the MAC 70. The MAC 70 transmits information, such as the received level information, the remaining power amount information, and the AC power supply connection information, from the wireless communication transmitting circuit 10 to another user terminal. As a result, another user terminal can control power supply in accordance with the above information. Accordingly, each user terminal can vary directivity of the antenna 84 or control a transmitted power level in accordance with the received level information that is received from another user terminal. Further, each user terminal can determine whether or not to perform power supply in accordance with the remaining power amount information and the AC power supply connection information, as will be described below.

The access point 100 that communicates with each of the user terminals 200, 202 and 204 includes a wireless communication transmitting circuit 10, a wireless communication receiving circuit 30, a transmission/reception switching unit 60, a MAC (data link layer) 70, and an antenna 80, which have the same configuration as each of the user terminals. Meanwhile, since the access point 100 does not exchange power with the user terminals, the access point 100 does not include the wireless power receiving circuit 50, the wireless power transmitting circuit 52, and the antennas 80 and 82.

FIG. 1 illustrates a state where an access point 100 and individual user terminals 200, 202 and 204 are connected to each other, such that wireless communication can be performed. In FIG. 1, it is assumed that the remaining power amount of the user terminal A 200 is reduced to a degree to which charging to the user terminal A 200 is needed. At this time, the user terminal A 200 uses wireless communication with the access point 100 to transmit a message indicating that the remaining power amount is small and a message indicating that it is needed to receive supplied power to the access point 100.

In order to grasp power situations of all of the user terminals that are connected through the wireless communication network, the access point 100 transmits a transmission request of power situation information to each of the user terminals. Meanwhile, each of the user terminals transmits power situation information to the access point 100.

In the example of FIG. 1, the user terminal B 202 is connected to the AC power supply 300. For this reason, the remaining power amount information and AC power supply connection information indicating that the user terminal B 202 is connected to the AC power supply 300 are transmitted from the user terminal B 202 to the access point 100.

If the access point 100 acquires the power situation information of each user terminal, the access point 100 grasps that the user terminal B 202 is connected to the AC power supply, and requests the user terminal B 202 to supply wireless power to the user terminal A 200. If the user terminal B 202 receives the request from the access point 100, the user terminal B 202 uses the above-described location detecting circuit to grasp the location of the user terminal A 200. As described above, since the access point 100 has the same configuration as the wireless communication transmitting circuit 10 and the wireless communication receiving circuit 30, the access point 100 can detect the location of the user terminal A 200 where the power is to be supplied. Accordingly, the access point 100 can detect the location of the user terminal A 200 and transmit the detected location information to the user terminal B 202.

The user terminal B 202 that receives the wireless power supply request from the access point 100 supplies the wireless power to the user terminal A 200, as illustrated in FIG. 5. In FIG. 5, in order to effectively supply the wireless power, directivity of wireless power supply is given to the direction of the user terminal 200, but the power supply may be performed without giving the directivity. When the directivity is given, the antenna 84 that supplies power is composed of an electronic control antenna such as a phased array antenna or an antenna that can mechanically control a direction of an antenna, and the directivity is controlled by the wireless power transmitting circuit 50 based on the location information of the user terminal.

Next, a method for supplying power from the wireless power transmitting circuit 52 of the user terminal to the wireless power receiving circuit 50 of another user terminal will be described. The wireless power transmitting circuit 52 includes a power exchanging unit 51 that operates in accordance with an operational principle, such as an electromagnetic inductive type, an electric wave reception type, a magnetic field resonance type, and an electric field resonance type. In addition, the wireless power receiving circuit 50 includes a power exchanging unit 251 that operates in accordance with the operational principle. Hereinafter, the configurations of the power exchanging units 51 and 251 that operate in accordance with each operational principle will be specifically described based on FIGS. 6A to 6D.

Figure 6A:
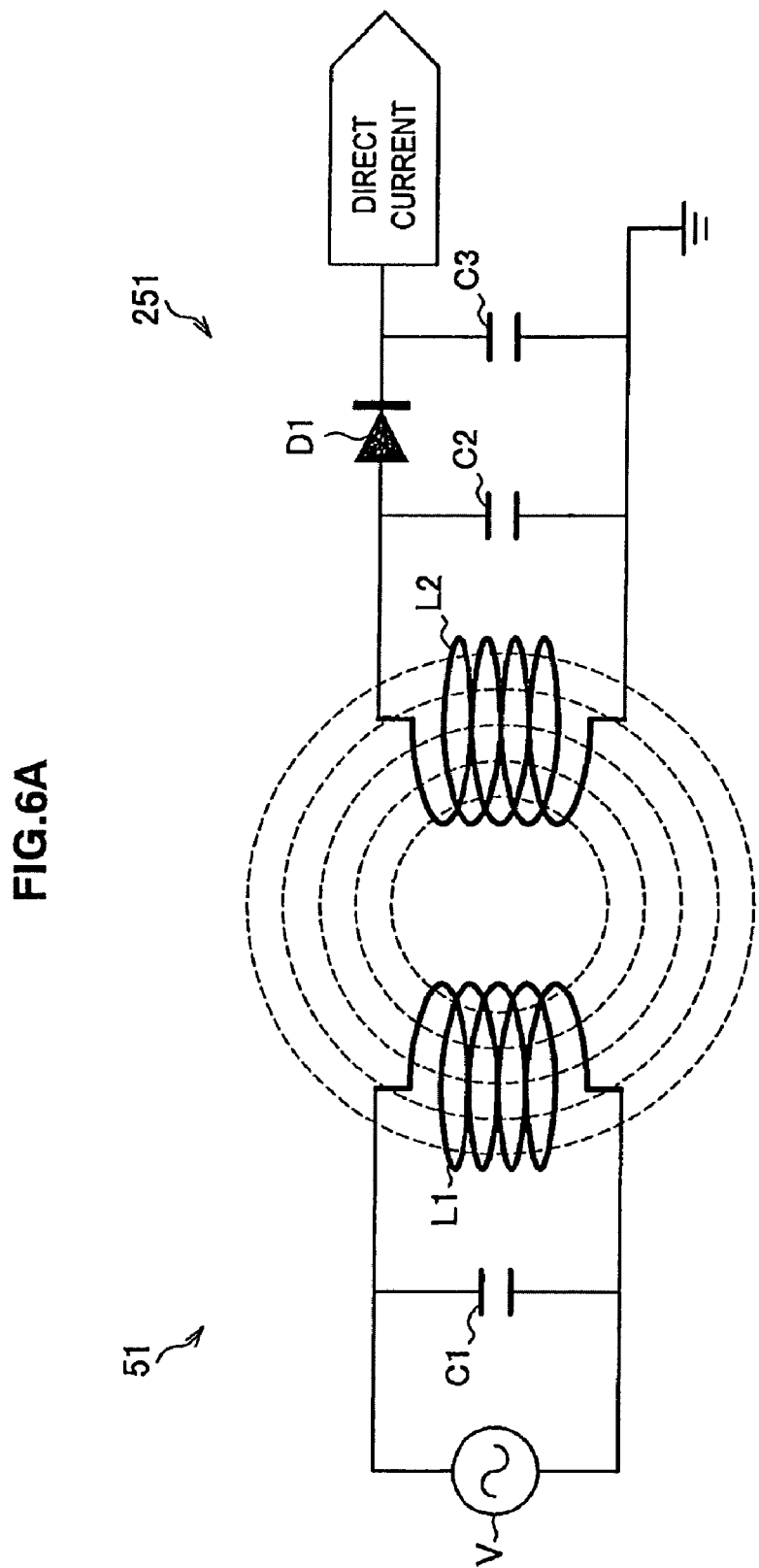
FIG. 6A is a diagram illustrating the configuration of a power exchanging unit that operates in an electromagnetic induction type.

FIG. 6A is a diagram illustrating the configurations of a power exchanging unit 51 and a power exchanging unit 251 that operate in an electromagnetic inductive type. As illustrated in FIG. 6A, the power exchanging unit 51 that operates in the electromagnetic inductive type includes an alternating current source V, a capacitor C1, and an inductor L1, and the power exchanging unit 251 includes an inductor L2, a capacitor C2, a capacitor C3, and a diode D1. In this configuration, if an alternating current is output from the alternating current source V, the alternating current flows through the inductor L1, and a magnetic flux is generated around the inductor L1. In addition, the diode D1 and the capacitor C3 rectify the alternating current that flows through the inductor L2 by the magnetic flux, and a direct current is obtained in the power exchanging unit 251.

Figure 6B:
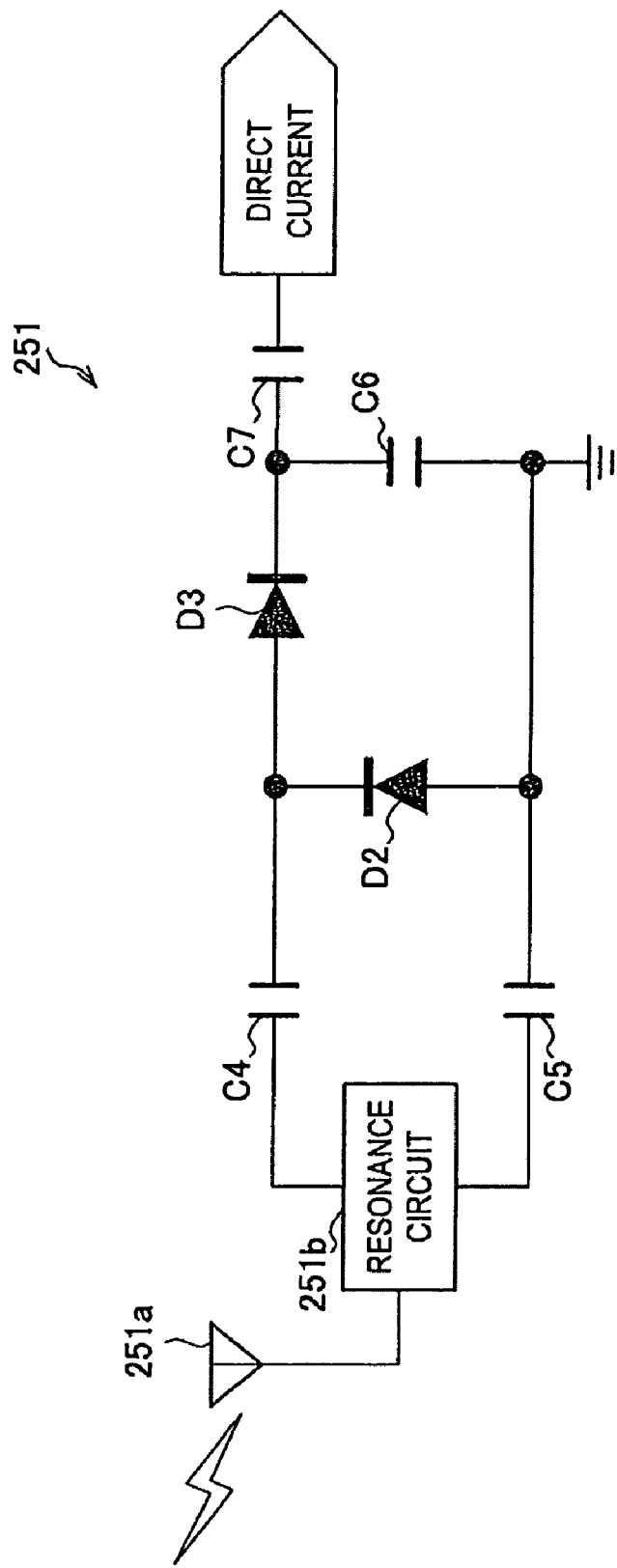
FIG. 6B is a diagram illustrating the configuration of a power exchanging unit that operates in an electric wave reception type.

FIG. 6B is a diagram illustrating the configuration of a power exchanging unit 251 that operates in an electric wave reception type. As illustrated in FIG. 6B, the power exchanging unit 251 that operates in the electric wave reception type includes an antenna 251*a*, a resonance circuit 251*b*, a capacitor C4, a capacitor C5, a diode D2, a diode D3, a capacitor C6, and a capacitor C7. In this configuration, if an electric wave is received by the antenna 251*a*, an alternating current is supplied from the antenna 251*a* to the resonance circuit 251*b*, and the resonance circuit 251*b* amplifies the alternating current using resonance. If a rectifying circuit composed of the diode D3 and the capacitor C6 rectifies the amplified alternating current, a direct current component is extracted, and the direct current is obtained in the power exchanging unit 251. In the case of the electric wave reception type, the wireless power transmitting circuit 52 can have the same configuration as the wireless communication transmitting circuit 10.

FIG. 6C is a diagram illustrating the configurations of a power exchanging unit 51 and a power exchanging unit 251 that operate in a magnetic field resonance type. As illustrated in FIG. 6C, the power exchanging unit 51 that operates in the magnetic field resonance type includes a capacitor C8 and an inductor L3, and the power exchanging unit 251 includes a capacitor C9 and an inductor L4. In the case of the magnetic field resonance type, it is possible to acquire power that is generated in the inductor L4 of the power exchanging unit 251 by magnetic field resonance that is generated in the inductors L3 and L4.

FIG. 6D is a diagram illustrating the configurations of a power exchanging unit 51 and a power exchanging unit 251 that operate in an electric field resonance type. As illustrated in FIG. 6D, each of the power exchanging units 51 and 251 that operate in the electric field resonance type is composed of a dielectric.

The magnetic field resonance type and the electric field resonance type use a principle of resonance in which, when two vibrators having the unique number of vibrations are arranged, a vibration applied to one side of the two vibrators is transmitted to the other side. In the magnetic field resonance type and the electric field resonance type, since transmission efficiency is high, it is possible to transmit power of several kilowatts at a distance of several meters.

Next, an example of when a user terminal to perform power supply is determined based on the remaining power amounts of the individual user terminals 200, 202 and 204 will be described with reference to FIGS. 7 and 8. As illustrated in FIG. 7, it is assumed that the remaining power amount of the user terminal A 200 is "small", the remaining power amount of the user terminal B 202 is "large", and the remaining power amount of the user terminal C 204 is "middle". The user terminal A 200 uses wireless communication with the access point 100 to transmit a message indicating that the remaining power amount is small and a message indicating that charging is needed to the access point 100. Similar to the case of FIG. 1, the access point acquires power situation information from each of the user terminals 200, 202 and 204 and grasps the remaining power amount of each of the user terminals 200, 202 and 204.

In addition, the access point 100 that has acquired the power situation information from the individual user terminals designates the user terminal B 202 having the largest remaining power amount as a terminal to supply power, and transmits an instruction signal (wireless power supply request) to the user terminal B 202, such that the user terminal B 202 supplies power to the user terminal A 200. The user terminal B 202 that has received the wireless power supply request from the access point 100 supplies wireless power to the user terminal A 200, as illustrated in FIG. 8.

Figure 9:
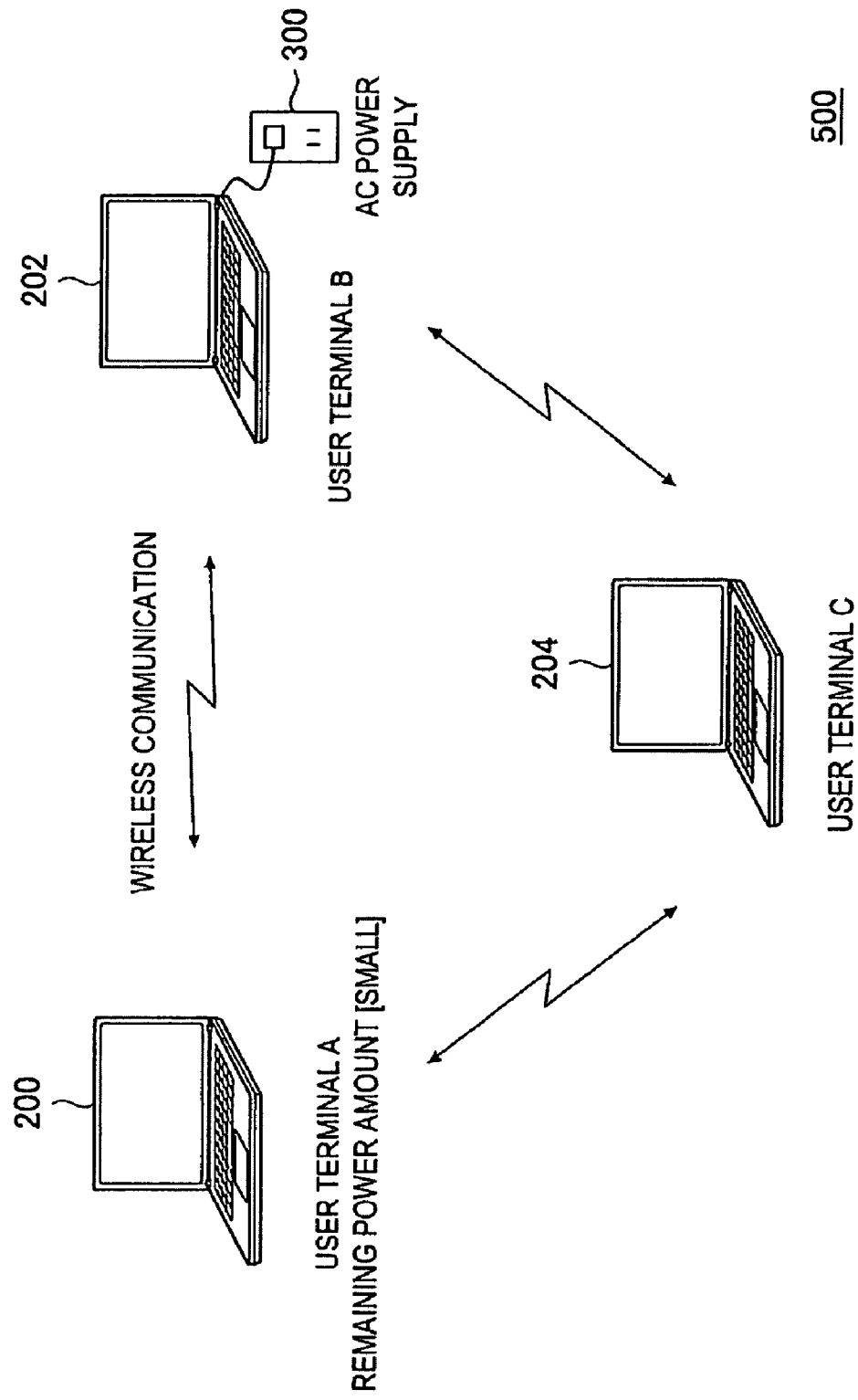
FIG. 9 is a schematic diagram illustrating a wireless communication system where an access point does not exist and a piconet is formed between user terminals.

FIGS. 9 and 10 illustrate a wireless communication system 500 where an access point 100 does not exist and a piconet is formed between user terminals 200, 202 and 204. In this case, as illustrated in FIG. 9, the user terminals 200, 202 and 204 can perform wireless communication with each other. The user terminal A 200 where the remaining power amount is reduced requests the other user terminals 202 and 204 within the piconet to transmit power situation information of the individual user terminals 202 and 204. As a result, the user terminal A 200 can grasp that the user terminal B 202 is connected to the AC power supply 300. In addition, the user terminal A 200 transmits a wireless power supply request to the user terminal B 202 that is connected to the AC power supply 300. The user terminal B 202 that has received the wireless power supply request detects the location of the user terminal A 200 and supplies the wireless power to the user terminal A 200, as illustrated in FIG. 10.

Similar to FIGS. 9 and 10, FIGS. 11 and 12 illustrate an example of when a user terminal to perform power supply is determined based on the remaining power amounts of the user terminals 200, 202 and 204, in the case where a piconet is formed between the user terminals 200, 202 and 204. In this case, the user terminal A 200 where the remaining power amount is reduced requests the other user terminals 202 and 204 within the piconet to transmit power situation information of the individual user terminals 202 and 204. In addition, the user terminal A 200 that has acquired the power situation information selects the user terminal B 202 having the largest remaining power amount as a power supply terminal with respect to the user terminal A 200, and transmits a wireless power supply request to the user terminal B 204. The user terminal B 202 that has received the wireless power supply request detects the location of the user terminal A 200 and supplies the wireless power to the user terminal A 200, as illustrated in FIG. 12.

FIG. 13 is a block diagram illustrating the functional configuration of a MAC 70 of each user terminal. The control of the wireless power supply in each user terminal is mainly performed by the MAC 70. As illustrated in FIG. 13, the MAC 70 includes a power situation information acquiring unit 72, a user terminal location acquiring unit 74, a power situation information transmitting unit 76, a power transmission instructing unit 78, and a control unit 79. The power situation information acquiring unit 72 acquires power situation information that is related to the corresponding terminal. The user terminal location acquiring unit 74 acquires a location of the individual user terminal based on an output (first and second user location estimation information) of the location detecting circuit that is illustrated in FIGS. 3 and 4. The power situation information transmitting unit 76 transmits power situation information to the access point 100 or another user terminal. The power transmission instructing unit 78 outputs an instruction signal that instructs the wireless power transmitting circuit 52 to perform wireless power supply. In order to transmit transmitted power direction information and transmitted power level information to the wireless power transmitting circuit 50 in accordance with the user terminal information and the user terminal location, the control unit 79 controls the power situation information transmitting unit 76 and the power transmission instructing unit 78.

As described above, the access point 100 has the same configuration as each of the user terminals 200, 202 and 204, and includes constituent elements that correspond to the MAC of the user terminals 200, 202 and 204. FIG. 14 is a block diagram illustrating the functional configuration of a MAC of an access point 100. As illustrated in FIG. 14, the MAC of the access point 100 includes a power supply request acquiring unit 102, a power situation information acquiring unit 104, a power supply request transmitting unit 106, and a control unit 108. The power supply request acquiring unit 102 acquires a power supply request that is transmitted from the user terminal where the remaining power amount is reduced. The power situation information acquiring unit 104 acquires power situation information that is transmitted from each user terminal. The power supply request transmitting unit 106 transmits a power supply request to a user terminal that is selected by the control unit 108 based on the power situation information and can supply power. The control unit 108 selects a user terminal that can supply power.

The functional block that is illustrated in FIGS. 13 and 14 can be configured by using hardware or an arithmetic processing unit (CPU) and software (program) that allows the arithmetic processing unit to function. When the functional block is configured by using the arithmetic processing unit and the software, the program can be stored in a recording medium, such as a memory, which is included in the user terminals 200, 202 and 204 or the access point 100. The process that will be described below can be realized by the functional block that is included in the MAC.

Next, a process in the wireless communication system 500 according to this embodiment will be described. FIG. 15 is a flowchart illustrating a process when an access point 100 outputs a power supply request to a user terminal, as described with reference to FIGS. 1 and 2.

First, in Step S11, the user terminal A 200 determines whether it is needed to request wireless power provision. In this case, the user terminal A 200 determines whether it is needed to request wireless power provision based on the remaining power amount.

When it is determined in Step S11 that it is needed to request wireless power provision, the process proceeds to Step S12, and the user terminal A 200 transmits a power supply request to the access point 100. In addition, the user terminal A 200 transmits a location estimation signal to the access point 100. Meanwhile, when it is determined in Step S11 that it is not needed to request wireless power provision, the process proceeds to Step S15, and only the wireless communication is continued.

In Step S21, the access point 100 receives the power supply request and the location estimation signal that are transmitted from the user terminal A 200. Next, in Step S22, a transmission request signal of power situation information is transmitted to a user terminal near the user terminal A 200.

In Step S31, the user terminal B 202 receives the transmission request signal of the power situation information that is transmitted from the access point 100. Next, in Step S32, the power situation information is transmitted to the access point 100.

In Step S23, the access point 100 receives the power situation information that is transmitted from the user terminal B 202. Further, in Step S23, the power situation information is received from another user terminal that has received the transmission request signal of the power situation information. Next, in Step S24, it is determined whether there is a user terminal that can supply power based on the received power situation information. In this case, the user terminal having the large remaining power amount or the user terminal connected to the AC power supply 300 are determined as the user terminal that can supply power.

When it is determined in Step S24 that there is the user terminal that can supply power, the process proceeds to Step S25, and the access point 100 transmits a power supply request to the user terminal that can supply power. Next, in Step S26, location information of the user terminal A 200 is transmitted to the user terminal B 202. In this case, the location information of the user terminal A 200 is detected by the location detecting circuit illustrated in FIGS. 3 and 4 based on the location estimation signal received in Step S21. Meanwhile, when it is determined in Step S24 that is no user terminal that can supply power, the process proceeds to Step S27, and the access point 100 transmits a power supply rejection signal to the user terminal A 200.

In Step S33, the user terminal B 202 receives the power supply request that is transmitted from the access point 100. Next, in Step S34, the user terminal B 202 receives the location information of the user terminal A 200 from the access point 100. Next, in Step S35, the user terminal B 202 supplies wireless power to the user terminal A 200. At this time, the user terminal B 202 can orient the directivity of the power supply to the user terminal A 200 based on the location information of the user terminal A 200.

In Step S13, the user terminal A 200 determines whether the power supply rejection signal transmitted from the access point 100 is received. When it is determined that the power supply rejection signal transmitted from the access point 100 is not received, the process proceeds Step S14, and the user terminal A 200 performs wireless communication through the wireless communication network and wirelessly receives the supplied power from the user terminal B 202. Meanwhile, when it is determined that the power supply rejection signal is received, the process proceeds to Step S15, and the user terminal A 200 continues only the wireless communication without receiving the supplied power.

Figure 16:
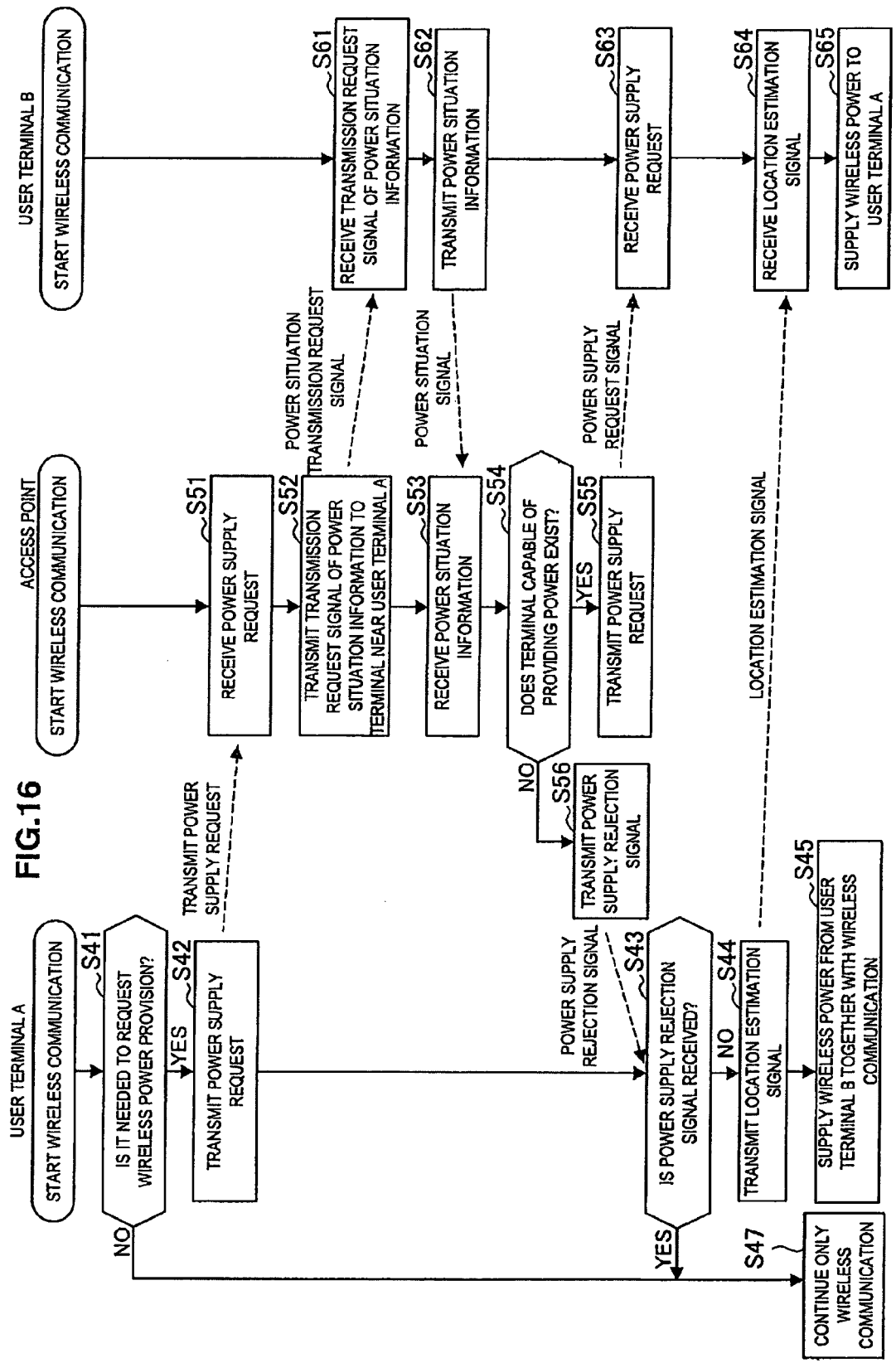
FIG. 16 is a flowchart illustrating a process when a user terminal B to supply power detects a location of a user terminal A of a power supply destination.

Similar to FIG. 15, FIG. 16 is a flowchart illustrating a process when an access point 100 transmits a power supply request to a user terminal, which illustrates a process in which a user terminal B 202 to supply power detects a location of a user terminal A 200 of a power supply destination.

First, in Step S41, the user terminal A 200 determines whether it is needed to request wireless power provision. The user terminal A 200 determines whether it is needed to request wireless power provision based on the remaining power amount.

When it is determined in Step S41 that it is needed to request wireless power provision, the process proceeds to Step S42, and the user terminal A 200 transmits a power supply request to the access point 100. Meanwhile, when it is determined in Step S41 that it is not needed to request the wireless power provision, the process proceeds to Step S47, and the user terminal A 200 continues only the wireless communication.

In Step S51, the access point 100 receives the power supply request that is transmitted from the user terminal A 200. Next, in Step S52, the access point 100 transmits the transmission request signal of the power situation information to the user terminal near the user terminal A 200.

In Step S61, the user terminal B 202 receives the transmission request signal of the power situation information that is transmitted from the access point 100. Next, in Step S62, the user terminal B 202 transmits the power situation information to the access point 100.

In Step S53, the access point 100 receives the power situation information that is transmitted from the user terminal B 202. Further, in Step S53, the access point 100 receives the power situation information from another user terminal that has transmitted the transmission request signal of the power situation information. Next, in Step S54, the access point 100 determines whether there is a user terminal that can supply power based on the power situation information.

When it is determined in Step S54 that there is the user terminal that can supply power, the process proceeds to Step S55, and the access point 100 transmits the power supply request to the user terminal that can supply power. At this time, the access point 100 transmits terminal specification information, which is used to specify the user terminal A 200 that transmits the power supply request, and the power supply request. Meanwhile, when it is determined in Step S54 that there is no user terminal that can supply power, the process proceeds to Step S56, and the access point 100 transmits the power supply rejection signal to the user terminal A 200.

In Step S43, the user terminal A 200 determines whether the power supply rejection signal transmitted from the access point 100 is received. When it is determined that the power supply rejection signal transmitted from the access point 100 is not received, the process proceeds to Step S44, and the user terminal A 200 transmits the location estimation signal to the user terminal B 202. Meanwhile, when it is determined that the power supply rejection signal is received, the process proceeds to Step S47, and the user terminal A 200 continues only the wireless communication.

In Step S63, the user terminal B 202 receives the power supply request that is transmitted from the access point 100. Next, in Step S64, the user terminal B 202 receives the location estimation signal that is transmitted from the user terminal A 200. The user terminal B 202 can confirm that the location estimation signal is transmitted from the user terminal A 200 based on the terminal specification information that is received from the access point 100. Next, in Step S65, the user terminal B 202 supplies the wireless power to the user terminal A 200.

In Step S45, the user terminal A 200 performs the wireless communication through a network, and wirelessly receives the supplied power from the user terminal B 202.

Figure 17:
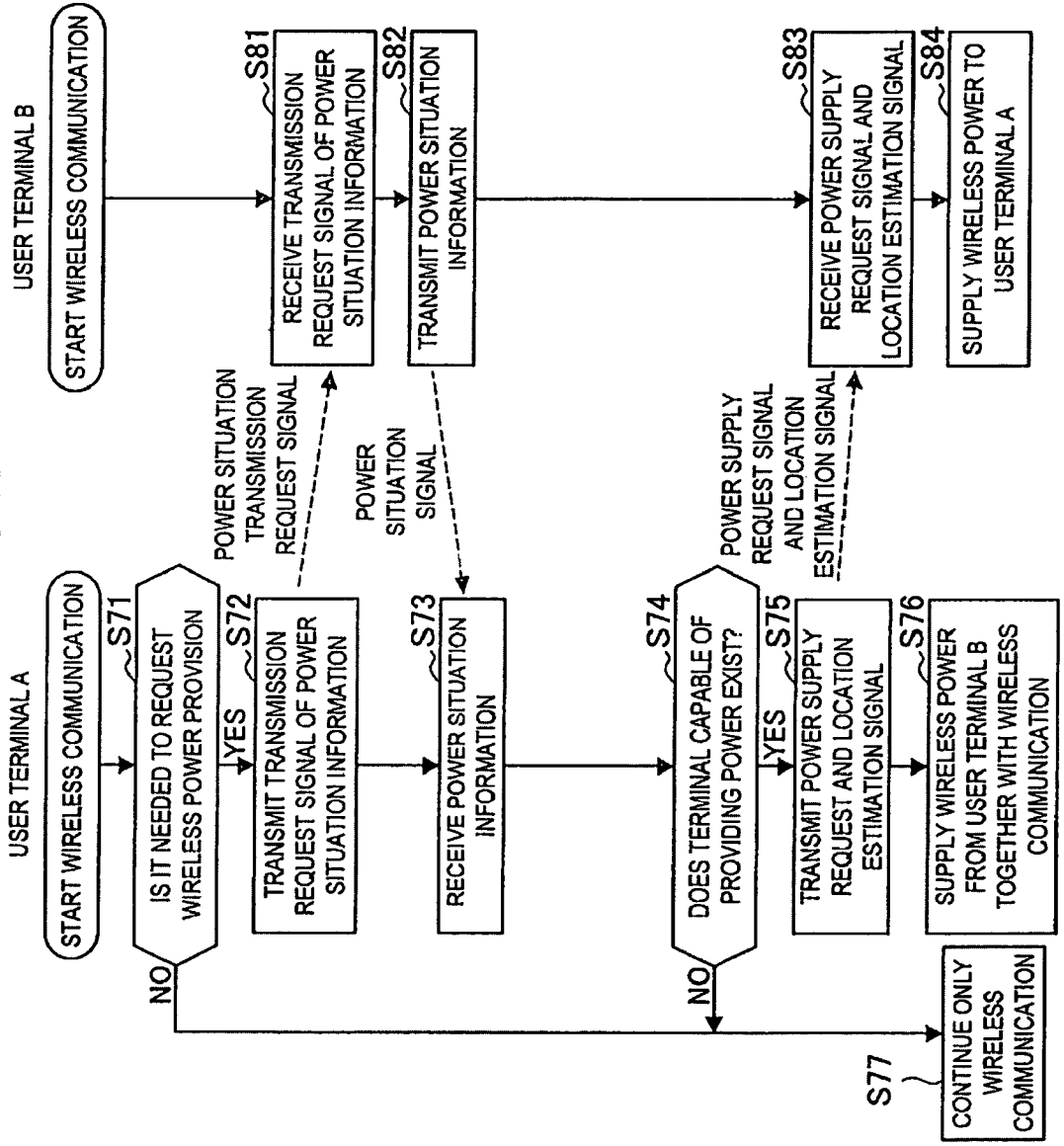
FIG. 17 is a flowchart illustrating a process when an access point does not exist and a piconet is formed between user terminals.

FIG. 17 is a flowchart illustrating a process in the case where an access point 100 does not exist and a piconet is formed between user terminals 200, 202 and 204. First, in Step S71, the user terminal A 200 determines whether it is needed to request wireless power provision. The user terminal A 200 determines whether it is needed to request wireless power provision based on the remaining power amount.

When it is determined in Step S71 that it is needed to request wireless power provision, the process proceeds to Step S72, and the user terminal A 200 transmits a transmission request signal of power situation information to another user terminal (in this case, the user terminal B 202 is exemplified). Meanwhile, when it is determined in Step S71 that it is not needed to request the wireless power provision, the process proceeds to Step S77, and the user terminal A 200 continues only the wireless communication.

If the user terminal B 202 receives the transmission request signal of the power situation information in Step S81, the user terminal B 202 transmits the power situation information to the user terminal A 200, in Step S82.

The user terminal A 200 receives the power situation information that is transmitted from the user terminal B 202 in Step S73. Further, in Step S73, the user terminal A 200 receives the power situation information that is transmitted from another user terminal. Next, in Step S74, the user terminal A 200 determines whether there is a user terminal that can supply power based on the power situation information that is transmitted from each user terminal. When it is determined in Step S74 that there is the user terminal that can supply power, the process proceeds to Step S75, and the user terminal A 200 transmits the power supply request and the location estimation signal to the user terminal that can supply power.

In Step S83, the user terminal B 202 receives the power supply request and the location estimation signal that are transmitted from the user terminal A 200. Next, in Step S84, the user terminal B 202 wirelessly supplies the power to the user terminal A 200.

In Step S76, the user terminal A 200 performs wireless communication and wirelessly receives the supplied power from the user terminal B 202.

As described above, according to this embodiment, the wireless power can be supplied from the user terminal to another user terminal. Accordingly, if the power is supplied from the user terminal that can supply the power to the user terminal where the remaining power amount is reduced, power of an arbitrary user terminal in a system can be surely suppressed from being decreased. As a result, in the case where a plurality of user terminals is used in a conference room, the power can be supplied from the user terminal connected to the AC power supply 300 to another user terminal. The power can be suppressed from being decreased with respect to all user terminals in the conference room, regardless of whether the user terminal is connected to the AC power supply 300.

Further, regardless of a battery utilization time for each user terminal, the user terminal having a small battery capacity receives power supplied from the user terminal having a large battery capacity. Thus, it is possible to surely suppress only the specific user terminal on the network from becoming disabled due to a decrease in the remaining power amount. Further, since the previously fixed wireless communication network can be used, the number of added systems can be reduced by grasping a power situation or a terminal location.

The present application contains subject matter related to that disclosed in Japanese Priority Patent Application JP 2008-100744 filed in the Japan Patent Office on Apr. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising:
a wireless communication unit that performs communication with a first apparatus connected through a wireless communication network;
a power situation acquiring unit that acquires a power situation of the wireless communication apparatus;
a location acquiring unit that acquires distance and direction information between the wireless communication apparatus and the first apparatus; and
a power supply unit that wirelessly supplies power to the first apparatus in accordance with a power supply request from the first apparatus and based on the distance and direction information, when the power situation of the wireless communication apparatus satisfies a predetermined condition.

2. The wireless communication apparatus according to claim 1, comprising:
a remaining power amount acquiring unit that acquires the remaining power amount of the wireless communication apparatus,
wherein, when the remaining power amount is not more than a predetermined value, the power supply request is transmitted to a second apparatus that is connected through the wireless communication network.

3. The wireless communication apparatus according to claim 1,
wherein the predetermined condition is a condition indicating that the wireless communication apparatus is connected to a power supply or a condition indicating that the remaining power amount of the wireless communication apparatus is not less than a predetermined value.

4. The wireless communication apparatus according to claim 1,
wherein the wireless communication unit receives the power supply request transmitted from the first apparatus through an access point of the wireless communication network.

5. The wireless communication apparatus according to claim 4, wherein
the wireless communication unit transmits the power situation of the wireless communication apparatus to the access point, and
the access point determines whether the power situation of the wireless communication apparatus satisfies the predetermined condition.

6. The wireless communication apparatus according to claim 1, wherein
the wireless communication unit receives the power supply request from the first apparatus, and transmits the power situation of the wireless communication apparatus to the first apparatus, and
the first apparatus that transmits the power supply request determines whether the power situation of the wireless communication apparatus satisfies the predetermined condition.

7. A wireless communication system comprising:
a wireless communication apparatus, comprising:
a power supply request acquiring unit that acquires a power supply request from a first and second terminal apparatuses connected to the wireless communication apparatus through a wireless communication network,
a power situation acquiring unit that acquires a power situation of the first and second terminal apparatuses, and
a power supply request transmitting unit that transmits the power supply request from the first terminal apparatus to the second terminal apparatus; and
the second terminal apparatus, comprising:
a power situation transmitting unit that transmits the power situation to the wireless communication apparatus,
a power supply request receiving unit that receives the power supply request,
a location acquiring unit that acquires distance and direction information between the wireless communication apparatus and the first apparatus, and
a power supply unit that wirelessly supplies power to the first terminal apparatus that transmits the power supply request to the wireless communication apparatus in accordance with the power supply request and based on the distance and direction information.

8. A wireless communication method comprising the steps of:
performing, by a self apparatus, communication with a first apparatus connected through a wireless communication network;

acquiring a power situation of the self apparatus;

acquiring distance and direction information between the self apparatus and the first apparatus; and wirelessly supplying power to the first apparatus in accordance with a power supply request from the first apparatus and based on the distance and direction information, when the power situation of the self apparatus satisfies a predetermined condition.

9. A non-transitory computer-readable medium storing a computer program, the computer program, when executed by a computer, causing the computer to function as:

a first unit performing communication with a first apparatus through a wireless communication network;

a second unit acquiring a power situation of the computer;

a third unit acquiring distance and direction information between the computer and the first apparatus; and a fourth unit wirelessly supplying power to the first apparatus in accordance with a power supply request from the first apparatus and based on the distance and direction information, when the power situation of the computer satisfies a predetermined condition.

* * * * *